(12) United States Patent
Li et al.

(10) Patent No.: US 10,403,878 B2
(45) Date of Patent: Sep. 3, 2019

(54) METHOD AND SYSTEM FOR SUPPLYING LITHIUM TO ELECTRODE PLATE

(71) Applicant: CONTEMPORARY AMPEREX TECHNOLOGY CO., LIMITED, Ningde, Fujian Province (CN)

(72) Inventors: Keqiang Li, Ningde (CN); Zuyu Wu, Ningde (CN); Wutang Zhang, Ningde (CN)

(73) Assignee: CONTEMPORARY AMPEREX TECHNOLOGY CO., LIMITED, Nindge, Fujian Province (CN)

( * ) Notice: Subject to any disclaimer, the term of this patent is extended or adjusted under 35 U.S.C. 154(b) by 209 days.

(21) Appl. No.: 15/255,772

(22) Filed: Sep. 2, 2016

(65) Prior Publication Data

US 2017/0200937 A1    Jul. 13, 2017

(30) Foreign Application Priority Data

Jan. 11, 2016  (CN) .......................... 2016 1 0015441

(51) Int. Cl.
*H01M 4/04* (2006.01)
*H01M 4/134* (2010.01)
(Continued)

(52) U.S. Cl.
CPC ......... *H01M 4/0435* (2013.01); *H01M 4/134* (2013.01); *H01M 4/1395* (2013.01); *H01M 4/382* (2013.01); *H01M 10/0525* (2013.01)

(58) Field of Classification Search
CPC .......... H01M 4/0435; H01M 10/0525; H01M 4/1395; H01M 4/134; H01M 4/382
See application file for complete search history.

(56) References Cited

U.S. PATENT DOCUMENTS

| | | | |
|---|---|---|---|
| 2006/0123622 A1* | 6/2006 | Guy ....................... | B65H 18/10 29/700 |
| 2011/0039138 A1* | 2/2011 | Jeong ................... | H01M 4/0435 429/94 |

(Continued)

FOREIGN PATENT DOCUMENTS

| CN | 201694677 U | * | 1/2011 |
|---|---|---|---|
| CN | 202888314 U | | 4/2013 |

(Continued)

OTHER PUBLICATIONS

Budo, Y., Hecker, E.P., Miller, D.L., and Vozzola, D.B., "Laminating Machine," IBM Technical Disclosure Bulletin No. 90A062366; vol. 33, No. 3B, Aug. 1990.*

(Continued)

*Primary Examiner* — Christopher T Schatz
*Assistant Examiner* — Cynthia L Schaller
(74) *Attorney, Agent, or Firm* — Nath, Goldberg & Meyer; Jerald L. Meyer; Joshua B. Goldberg (57) ABSTRACT

The present invention provides a method and a system for supplying lithium to an electrode plate. The method includes: compositing a first substrate and a first lithium strip to form a first composite lithium strip, and forming an obstruction using a second substrate between the first lithium strip and a compositing device, compositing the first composite lithium strip and an electrode plate to be supplied with lithium to form a lithium supplied composite electrode plate, during the compositing process, the first substrate in the first composite lithium strip is located at a side away from the electrode plate to be supplied with lithium, peeling and reeling the first substrate from the lithium supplied composite electrode plate, to form a lithium supplied electrode plate.

9 Claims, 6 Drawing Sheets

(51) Int. Cl.
    *H01M 4/38*       (2006.01)
    *H01M 4/1395*     (2010.01)
    *H01M 10/0525*    (2010.01)

(56) References Cited

U.S. PATENT DOCUMENTS

2013/0149560 A1* 6/2013 Viavattine ......... H01M 10/0445
                                                   429/7
2014/0023922 A1   1/2014 Isshiki et al.

FOREIGN PATENT DOCUMENTS

| CN | 203393461 U | * | 1/2014 |
| CN | 104868127 A | | 8/2015 |
| CN | 205264795 U | | 5/2016 |
| EP | 0 147 929 A1 | | 7/1985 |
| EP | 0 556 131 A1 | | 8/1993 |
| JP | 5-258744 A | | 10/1993 |
| WO | 2012/099264 A1 | | 7/2012 |

OTHER PUBLICATIONS

CN-201694677-U Machine Translation of Description (EPO and Google).*
CN-203393461-U Machine Translation of Description (EPO and Google).*
Chinese office action dated Jul. 18, 2017 for corresponding CN application 201610015441.8 with English Translation.
Japanese office action dated Jul. 4, 2017 for corresponding JP application 2016-126897 with English Translation.
Japanese Office Action in corresponding JP application No. 2016-126897.

* cited by examiner

METHOD AND SYSTEM FOR SUPPLYING LITHIUM TO ELECTRODE PLATE

TECHNICAL FIELD

The present invention relates to the field of Li-ion battery manufacturing technologies and, in particular, to a method and a system for supplying lithium to an electrode plate.

BACKGROUND

During the first charging process, the battery will lose some lithium due to formation of the solid electrolyte interface (Solid Electrolyte Interface, SEI), which may cause lithium loss of anode material, thereby reducing the battery capacity and the first time efficiency. The above phenomenon occurs particularly in the cathode plate which adopts alloy material (e.g. silicon alloy and tin alloy etc.) as the active substance. In addition, during the cyclic process of the Li-ion battery, the SEI is consumed and repaired, which leads to continuous decreasing of the battery capacity due to increasing of inactive lithium in the anode and cathode, resulting in reduction of battery cycle life. In order to avoid the reduction of battery capacity brought by irreversible capacity during first time charging-discharging and cyclic process of the battery, supplying some active lithium to the cathode electrode plate of the Li-ion battery can effectively solve the above problem.

In the related art, since the lithium piece of the battery is very thin and the strength is low, which cannot be manufactured continuously in practice due to strip breakage.

SUMMARY

The present application provides a method and a system for supplying lithium to an electrode plate, which can effectively prevent the lithium strip from breakage.

A first aspect of the present application provides a method for supplying lithium to an electrode plate, including the following steps:

10) compositing a first substrate and a first lithium strip to form a first composite lithium strip, and forming an obstruction using a second substrate between the first lithium strip and a compositing device, 20) compositing the first composite lithium strip and an electrode plate to be supplied with lithium to form a lithium supplied composite electrode plate, during the compositing process, the first substrate in the first composite lithium strip is located at a side away from the electrode plate to be supplied with lithium, 30) peeling and reeling the first substrate from the lithium supplied composite electrode plate, to form a lithium supplied electrode plate.

Preferably, before the step 20), further including the following steps:

10') compositing a third substrate and a second lithium strip to form a second composite lithium strip, and forming an obstruction using a fourth substrate between the second lithium strip and the compositing device, the step 20) specifically includes:

compositing the first composite lithium strip, the electrode plate to be supplied with lithium and the second composite lithium strip to form a lithium supplied composite electrode plate, during the compositing process, the first substrate in the first composite lithium strip and the third substrate in the second composite lithium strip are located at two sides away from the electrode plate to be supplied with lithium, and form an obstruction between the first lithium strip and the compositing device, the step 30) specifically includes:

peeling and reeling the first substrate and the third substrate from the lithium supplied composite electrode plate, to form a lithium supplied electrode plate.

Preferably, the step 10) specifically includes:

100) unreeling the first lithium strip, the first substrate and the second substrate at the same time.

110) laminatedly arranging the first substrate, the first lithium strip and the second substrate in sequence, and compositing the first substrate, the first lithium strip and the second substrate laminatedly arranged in sequence by a roll-in device, so as to form a first composite strip, 120) peeling and reeling the second substrate in the first composite strip, so that the remained first lithium strip and the first substrate form the first composite lithium strip;

and/or the step 10') specifically includes:

100') unreeling the second lithium strip, the third substrate and the fourth substrate at the same time, 110') laminatedly arranging the third substrate, the second lithium strip and the fourth substrate in sequence, and compositing the third substrate, the second lithium strip and the fourth substrate laminatedly arranged in sequence by the roll-in device, so as to form a second composite strip, 120') peeling and reeling the fourth substrate in the second composite strip, so that the remained second lithium strip and the third substrate form the second composite lithium strip.

Preferably, step 102) is further included between step 100) and step 110): smoothing the first lithium strip with a constant pressure by defining a minimum thickness, levelling the thickness of the first lithium strip;

and/or step 102') is further included between step 100') and step 110'): smoothing the second lithium strip with a constant pressure by defining a minimum thickness, levelling the thickness of the second lithium strip.

Preferably, after the step 30), further including the following steps:

40) reeling the lithium supplied electrode plate.

Preferably, the step 40) specifically includes:

reeling the lithium supplied electrode plate in a temperature controlled environment.

A second aspect of the present application provides a system for supplying lithium to an electrode plate, including an electrode plate unreeling device, a first composite lithium strip transportation device, an electrode plate lithium supply roll-in device, a first electrode plate peeling device, a first substrate reeling device, the electrode plate unreeling device and first composite lithium strip transportation device are both arranged at upstream of the electrode plate lithium supply roll-in device, the first electrode plate peeling device is arranged at downstream of the electrode plate lithium supply roll-in device, the first substrate reeling device is arranged at downstream of the first electrode plate peeling device, wherein:

the electrode plate lithium supply roll-in device includes two oppositely arranged compression rollers, the two compression rollers have a fixed distance with respect to one another, the first composite lithium strip transportation device includes: a first lithium strip unreeling roller, a first substrate unreeling roller, a second substrate unreeling roller, a second substrate reeling roller and a first composite roller set, the first lithium strip unreeling roller, the first substrate unreeling roller and the second substrate unreeling roller are arranged at upstream of the first composite roller set, the second substrate reeling roller is arranged at downstream of the first composite roller set.

Preferably, further including a second composite lithium strip transportation device, a second electrode plate peeling device and a third substrate reeling device, the second composite lithium strip transportation device is also arranged at upstream of the electrode plate lithium supply roll-in device, the second electrode plate peeling device and the third substrate reeling device are arranged at downstream of the first electrode plate peeling device in sequence, the second composite lithium strip transportation includes: a second lithium strip unreeling roller, a third substrate unreeling roller, a fourth substrate unreeling roller, a fourth substrate reeling roller and a second composite roller set, the second lithium strip unreeling roller, the third substrate unreeling roller and the fourth substrate unreeling roller are arranged at upstream of the second composite roller set, the fourth substrate reeling roller is arranged at downstream of the second composite roller set.

Preferably, the first composite lithium strip transportation device further includes an elastic distance lithium strip smoothing device, arranged between the first lithium strip unreeling device and the first composite roller set, and/or the second composite lithium strip transportation device further includes an elastic distance lithium strip smoothing device, arranged between the second lithium strip unreeling device and the second composite roller set, wherein, the elastic distance lithium strip smoothing device includes a second fixed smoothing roller, a second adjusting smoothing roller, a limiting member and an elastic pressuring mechanism, a location of the second fixed smoothing roller is fixed, a location of the second adjusting smoothing roller is adjustable, the limiting member can limit the minimum distance between the second fixed smoothing roller and the second adjusting smoothing roller, the elastic pressuring mechanism is fixedly arranged at one side of the second adjusting smoothing roller away from the second fixed smoothing roller, and is enabled to apply an elastic force to the second adjusting smoothing roller so that the second adjusting smoothing roller moves close to the second fixed smoothing roller.

Preferably, the electrode plate lithium supply roll-in device further includes a distance adjusting structure, the two compression rollers are a fixed compression roller and an adjustable compression roller respectively, a location of the fixed compression roller is fixed, a location of the adjustable compression roller is adjustable, the distance adjusting structure is arranged at one side of the adjustable compression roller away from the fixed compression roller, and is enabled to drive the adjustable compression roller to move close to or away from the fixed compression roller.

Preferably, the distance adjusting structure includes a rotating motor, a screw rod and a threaded sleeve, the threaded sleeve is fixedly connected with a roller seat of the adjustable compression roller, an axis of the threaded sleeve is parallel to a central connecting line between the fixed compression roller and the adjustable compression roller, the screw rod is threadedly connected with the threaded sleeve, an output end of the rotating motor is co-axially connected with the screw rod, and is enabled to drive the screw rod to rotate.

Preferably, the electrode plate lithium supply roll-in device further includes a compression roller gap limiting mechanism, the compression roller gap limiting mechanism includes an adjustable screw rod and a limiting inclined block, the limiting inclined block is arranged between roller seats of the fixed compression roller and the adjustable compression roller, and the roller seat of the adjustable compression roller abuts an inclined surface of the limiting inclined block, the adjustable screw rod is threadedly connected with the limiting inclined block, an axis of the adjustable screw rod is perpendicular to a central connecting line between the fixed compression roller and the adjustable compression roller, and forms a sharp angle with the inclined surface of the limiting inclined block.

Preferably, the first electrode plate peeling device includes two oppositely arranged first peeling rollers, the two first peeling rollers have a fixed distance, with respect to one another, the first electrode plate peeling device can rotate about a direction parallel to axes of the two first peeling rollers;

and/or the second electrode plate peeling device includes two oppositely arranged second peeling rollers, the two second peeling rollers have a fixed distance with respect to one another, the second electrode plate can rotate about a direction parallel to axes of the two first peeling rollers.

Preferably, further including a lithium supplied electrode plate reeling device, the lithium supplied electrode plate reeling device is arranged at downstream of the second electrode plate peeling device. Preferably, further including an electrode plate reeling cooling device, which surrounds the lithium supplied electrode plate reeling device.

The technical solutions provided by the present application can achieve the following effects:

The method and system for supplying lithium to an electrode plate provided by the present application, through adopting the substrate, on one hand, improving the strength of the lithium strip, on the other hand, forming an obstruction between the lithium strip and the composite device, so that the lithium strip will not directly contact the composite device during the transportation process, thereby avoid the lithium strip from breakage and cut during the manufacturing process.

It should be understood that, the above general description and the following detailed description are only exemplary, and will not limit the present application.

The drawings here are incorporated into the present description and form a part thereof, which show embodiments of the present application, and are used to explain the principle of the present application together with the description.

DESCRIPTION OF EMBODIMENTS

The present application will be described in further detail with reference to the following embodiments and the accompanying drawings. The "front", "back", "left", "right", "up", "down" used in this paper take the placement status of the system for supplying lithium to electrode plate in the drawings as reference.

Figure 1:
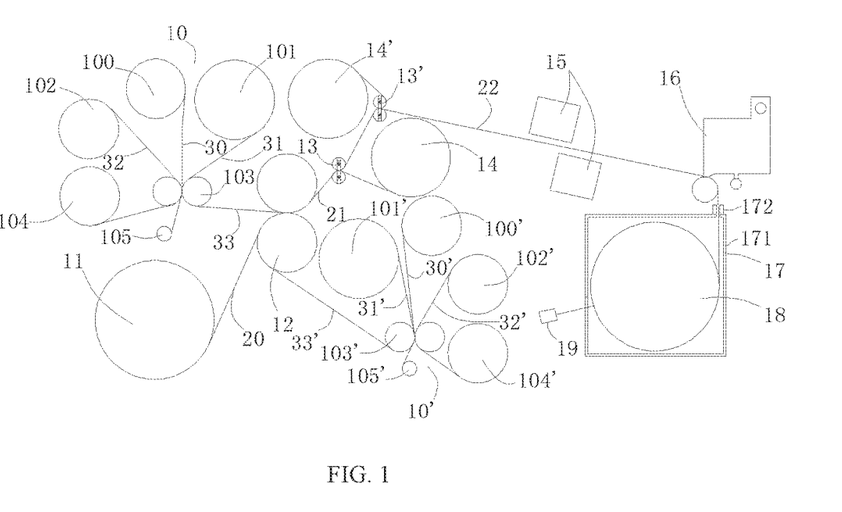
FIG. 1 is an integral structural schematic view of a system for supplying lithium to an electrode plate provided by an embodiment of the present application.

As shown in FIG. 1, an embodiment of the present application provides a system for supplying lithium to an electrode plate, including a first composite lithium strip transportation device 10, a second composite lithium strip transportation device 10', an electrode plate unreeling device 11, an electrode plate lithium supply roll-in device 12, a first electrode plate peeling device 13, a second electrode plate peeling device 13', a first substrate reeling device 14, a third substrate reeling device 14', an appearance detection device 15, a defective product labeling device 16, an electrode plate reeling cooling device 17, a lithium supplied electrode plate reeling device 18 and a reeling temperature monitoring device 19. The first composite lithium strip transportation device 10, the second composite lithium strip transportation device 10' and the electrode plate unreeling device 11 are arranged at upstream of the electrode plate lithium supply roll-in device 12.

The first composite lithium strip transportation device 10 is configured to composite and form a first composite lithium strip 33 containing a first lithium strip 30 and a first substrate 31, and transport to the electrode plate lithium supply roll-in device 12. The first composite lithium strip transportation device 10 specifically includes a first lithium strip unreeling roller 100, a first substrate unreeling roller 101, a second substrate unreeling roller 102, a first composite roller set 103 and a second substrate reeling roller 104. The first lithium strip unreeling roller 100 is configured to unreel the first lithium strip 30, the first substrate unreeling roller 101 is configured to unreel the first substrate 31, the second substrate unreeling roller 102 is configured to unreel the second substrate 32. The first lithium strip unreeling roller 100, the first substrate unreeling roller 101 and the second substrate unreeling roller 102 are located at the upstream of the first composite roller set 103, so that the first lithium strip 30, the first substrate 31 and the second substrate 32 can enter the first composite roller set 103 to composite after being unreeled, so as to form a first composite strip. Before entering the first composite roller set 103, the first substrate 31, the first lithium strip 30 and the second substrate 32 are laminatedly arranged in sequence, so that the first lithium strip 30 is located between the first substrate 31 and the second substrate 32, when performing composite roll-in, the first lithium strip 30 is protected by the first substrate 31 and the second substrate 32 at two sides thereof, so as to avoid the first lithium strip 30 from directly contacting the first composite roller set 103 or then being cut. After the composition is accomplished, the second substrate 32 has finished its protection function, thus the second substrate reeling roller 104 is arranged at the downstream of the first composite roller set 103, peeling and reeling the second substrate 32 in the first composite strip, so that the remained first lithium strip 30 and the first substrate 31 form the first composite lithium strip 33.

Similarly, the second composite lithium strip transportation device 10' is configured to composite and form a second composite lithium strip 33' containing a second lithium strip 30' and a third substrate 31', and transport to the electrode plate lithium supply roll-in device 12. The second composite lithium strip transportation device 10' specifically includes a second lithium strip unreeling roller 100', a third substrate unreeling roller 101', a fourth substrate unreeling roller 102', a second composite roller set 103' and a fourth substrate reeling roller 104'. The second lithium strip unreeling roller 100' is configured to unreel the second lithium strip 30', the third substrate unreeling roller 101' is configured to unreel the third substrate 31', the fourth substrate unreeling roller 102' is configured to unreel the fourth substrate 32'. The second lithium strip unreeling roller 100', the third substrate unreeling roller 101' and the fourth substrate unreeling roller 102' are located at the upstream of the second composite roller set 103', so that the second lithium strip 30', the third substrate 31' and the fourth substrate 32' can enter the first composite roller set 103 to composite after being unreeled, so as to form a second composite strip. Before entering the second composite roller set 103', the third substrate 31', the second lithium strip 30' and the fourth substrate 32' are laminatedly arranged in sequence, so that the second lithium strip 30' is located between the third substrate 31' and the fourth substrate 32', when performing composite roll-in, the second lithium strip 30' is protected by the third substrate 31' and the fourth substrate 32' at two sides thereof, so as to avoid the second lithium strip 30' from directly contacting the first composite roller set 103 or then being cut. After the composition is accomplished, the fourth substrate 32' has finished its protection function, thus the fourth substrate reeling roller 104' is arranged at the downstream of the second composite roller set 103', peeling and reeling the fourth substrate 32' in the fourth composite strip, so that the remained second lithium strip 30' and the third substrate 31' form the second composite lithium strip 33'.

The first composite roller set 103 and the second composite roller set 103' can be provided with a temperature controlling device configured to adjust the temperature of the roller set, so as to adjust the temperature of the first lithium strip 30 and the second lithium strip 30' during compositing. The temperature controlling device can adopt the manner of air cooling, oil cooling and water cooling etc.

The electrode plate lithium supply roll-in device 12 includes two oppositely arranged compression rollers, the two compression rollers can have a fixed distance with respect to one another. The generated first composite lithium strip 33 and the second composite lithium strip 33' will be transported to a place between the two compression rollers of the electrode plate lithium supply roll-in device 12. At the same time, the electrode plate unreeling device 11 is configured to unreel the electrode plate to be supplied with lithium 20, the unreeled electrode plate to be supplied with lithium 20 is also transported to the place between the two compression rollers of the electrode plate lithium supply roll-in device 12. The first composite lithium strip 33, the second composite lithium strip 33' and the electrode plate to be supplied with lithium 20 will be rolled-in and composited together in the electrode plate lithium supply roll-in device 12, so as to form a lithium supplied composite electrode plate 21. During the compositing process, the first lithium piece 30 in the first composite lithium strip 33 and the second lithium piece 30' in the second composite lithium strip 33' are both oriented towards the electrode plate to be supplied with lithium 20, while the first substrate 31 and the third substrate 31' are arranged at two sides, respectively, away from the electrode plate to be supplied with lithium 20, and form an obstruction between the electrode plate to be supplied with lithium 20 and the electrode plate lithium supply roll-in device 12, so as to avoid breakage and cut during the lithium supplying and compositing process. Similarly, the electrode plate lithium supply roll-in device 12 can also be provided with a temperature controlling device so as to adjust the temperature of the roller set.

In the present embodiment, through the first composite lithium strip transportation device 10 and the second composite lithium strip transportation device 10', the electrode plate to be supplied with lithium 20 can be supplied with lithium at two sides thereof at the same time. If only one side of the electrode plate to be supplied with lithium 20 needs to be supplied with lithium, then only the first composite lithium strip transportation device 10 is needed.

Figure 2:
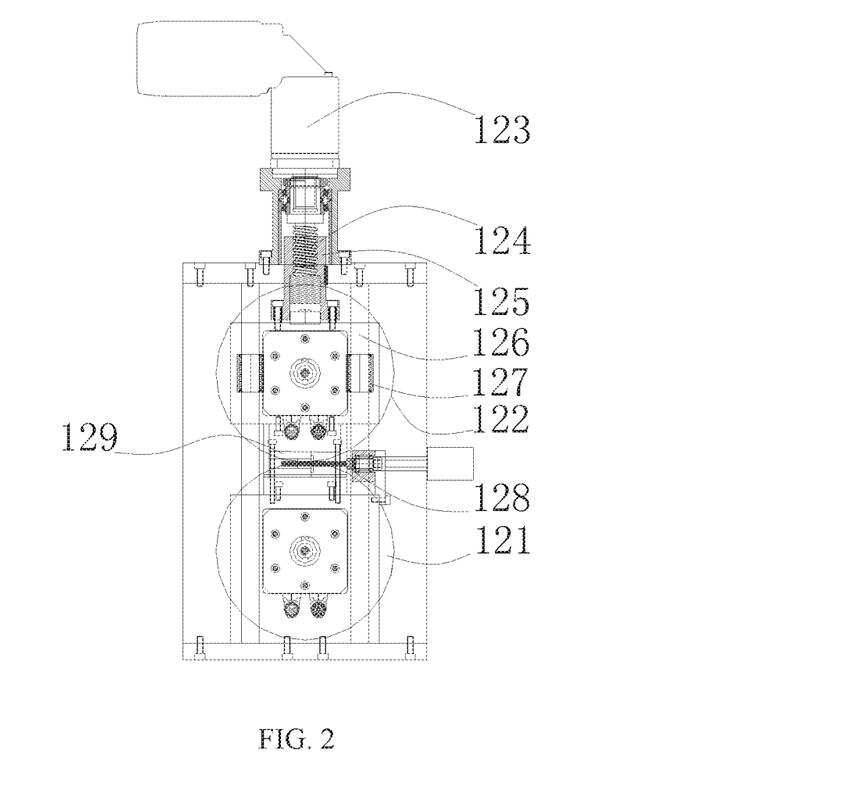
FIG. 2 is a structural schematic view of an electrode plate lithium supply roll-in device provided by an embodiment of the present application.

In some situations, for example, the thickness of the electrode plate to be supplied with lithium 20 at the connection portion of two rolls of electrode plate to be supplied with lithium 20 increases suddenly, or a certain portion of the electrode plate to be supplied with lithium 20 does not need to be supplied with lithium, therefore, such a special portion does not need or is required not to be rolled-in and composited when passing through the electrode plate supplying lithium roll-in device 12. In order to solve this problem, as shown in FIG. 2, in the present embodiment, the electrode plate lithium supply roll-in device 12 further includes a distance adjusting structure, at the same time, two compression roller are a fixed compression roller 121 and an adjustable compression roller 122, respectively. The position of the fixed compression roller 121 is kept unchanged, and is only enabled to rotate about the circumferential direction, the position of the adjustable compression roller 122 can also be adjusted in addition to rotating about the circumferential direction, then the distance adjusting structure is arranged on one side of the adjustable compression roller 122 away from the fixed compression roller 121, and is configured to adjust the position of the adjustable compression roller 122, so that the distance between the fixed compression roller 121 and the adjustable compression roller 122 increases or decreases, so as to meet different requirements under different operating conditions.

As shown in FIG. 2, the distance adjusting structure includes a rotating rotor 123, a screw rod 124 and a threaded sleeve 125, the threaded sleeve 125 is fixedly connected with the roller seat of the adjustable compression roller 122, the axis of the threaded sleeve 125 is parallel to the central connecting line between the fixed compression roller 121 and the adjustable compression roller 122, the screw rod 124 is threadedly connected with the threaded sleeve 125, the output end of the rotating motor 123 is coaxially connected with the screw rod 124, and can drive the screw rod 124 to rotate. In this way, when the screw rod 124 is rotating, the rotation can be transformed to a linear motion through the screw-thread fit with the threaded sleeve 125, so as to drive the threaded sleeve 125 to move together with the adjustable compression roller 122 connected with the threaded sleeve 125, thereby adjusting the distance between the fixed compression roller 121 and the adjustable compression roller 122.

In addition, in order to let the movement of the adjustable compression roller 122 be more steady and directional, a roller guiding pillar 126 and a roller sliding block 127 can be further arranged on the distance adjusting structure. The axis of the compression roller guiding pillar 126 is parallel to the central connecting line between the fixed compression roller 121 and the adjustable compression roller 122, the compression roller sliding block 127 is fit and connected with the compression roller guiding pillar 126, and can slide along the axial direction of the compression roller guiding pillar 126, at the same time, the adjustable compression roller 122 is also fixedly connected with the compression roller sliding block 127. In this way, the adjustable compression roller 122 can only move along the axial direction of the compression roller guiding pillar 126, forces from other directions will be transferred to the compression roller guiding pillar 126 by the compression roller sliding block 127, and are absorbed by the compression roller guiding pillar 126. It is preferred to provide a plurality of compression roller guiding pillars 126, which are symmetrically distributed with respect to the adjustable compression roller 122, so as to improve the balance of the stressed force. The compression roller sliding block 127 can adopt a high-accuracy bearing seat, which not only can slide, but also can reduce friction.

In practical operation, the electrode plate lithium supply roll-in device 12 may have to perform lithium supplying on electrode plates to be supplied with lithium 20 of different models/sizes, in such situation, if the distance between the fixed compression roller 121 and the adjustable compression roller 122 cannot be accurately positioned, the lithium supplying process will be affected. In order to enable the adjustable compression roller 122 to move rapidly under such situation, the size of the transmission part adopted by the distance adjusting structure needs to be relatively large. Then, it is quite difficult, if not impossible, to require the distance adjusting structure to maintain the distance between the fixed compression roller 121 and the adjustable compression roller 122, even if it can be achieved, the cost will be really high. Therefore, in the present embodiment, the electrode plate lithium supply roll-in device 12 further includes a compression roller gap limiting mechanism. The compression roller gap limiting mechanism includes an adjustable screw rod 128 and a limiting inclined block 129, the limiting inclined block 129 is arranged between the fixed compression roller 121 and the roller seat of the adjustable compression roller 122, the roller seat of the adjustable compression roller 122 abuts the inclined surface of the limiting inclined block 129, the adjustable screw rod 128 is threadedly connected with the limiting inclined block 129, the axis of the adjustable screw rod 128 is perpendicular to the central connecting line between the fixed compression roller 121 and the adjustable compression roller 122, and forms a sharp angle with the inclined surface (not shown in the figure) of the limiting inclined block 129. When rotating the adjustable screw rod 128, the limiting inclined block 129 can move along the axial direction of the adjustable screw rod 128, since the inclined surface of the limiting inclined block 129 forms a sharp angle with the axis of the adjustable screw rod 128, thus during the movement of the limiting inclined block 129, the relative distance between the portion of the inclined surface abutting the adjustable compression roller 122 and the fixed compression roller 121 changes, thereby providing a relatively accurate limitation on the distance between the adjustable compression roller 122 and the fixed compression roller 121.

Before operation, first using the distance adjusting structure to let the adjustable compression roller 122 away from the fixed compression roller 121, then adjusting the position of the limiting inclined block 129 according to the size/model of the electrode plate to be supplied with lithium 20, after finishing position adjustment of the limiting inclined block 129, starting the distance adjusting mechanism again to let the adjustable compression roller 122 move towards the fixed compression roller 121 and finally abut the inclined surface of the limiting inclined block 129. Then the position of the adjustable compression roller 122 can be accurately limited. After the operation begins, as long as the distance adjusting structure keeps the adjustable compression roller 122 tightly abutting the inclined surface of the limiting inclined block 129, the distance between the fixed compression roller 121 and the adjustable compression roller 122 can be guaranteed to be unchanged, thus the positioning accuracy is high.

After completing the lithium supply composition, the lithium strip is totally composited with the electrode plate, it is not needed to worry that it will be cut, thus the function of the first substrate 31 and the third substrate 31' is finished, which need to be removed. As shown in FIG. 1, in the present embodiment, the first electrode plate peeling device 13 and the second electrode plate peeling device 13' are arranged at downstream of the electrode plate lithium supply roll-in device 12 in sequence, the first substrate reeling device 14 is arranged at downstream of the first electrode plate peeling device 13, the third substrate reeling device 14' and the lithium supply electrode plate reeling device 18 are arranged at downstream of the second electrode plate peeling device 13', respectively. Lithium supplied composite electrode plate 21, after being composited by the electrode plate lithium supply roll-in device 12, will penetrate into the first electrode plate peeling device 13, then the first substrate 31 will be peeled from the lithium supplied composite electrode plate 21, then the first substrate 31 will be transferred to the first substrate reeling device 14 to be rolled, the remaining part of the lithium supplied composite electrode plate 21 will continue to penetrate into the second electrode plate peeling device 13'. During passing through the second electrode plate peeling device 13', the third substrate 31' will be peeled from the lithium supplied composite electrode plate 21, the remaining part is the lithium supplied electrode plate 22. Then the third substrate 31' and the lithium supplied electrode plate 22 are rolled respectively by the third substrate reeling device 14' and the lithium supplied electrode plate reeling device 18. Obviously, if only the first composite lithium strip transportation device 10 is provided, then it is not needed to arrange the second electrode plate peeling device 13' and the third substrate reeling device 14' at downstream of the first electrode plate peeling device 13, but directly transfer the lithium supplied electrode plate 22 formed by peeling the first substrate off to the lithium supplied electrode plate reeling device 18 to be rolled.

In addition, the lithium supplied electrode plate reeling device 18 is only used as the reeling device of the lithium supplied electrode plate 22, if the lithium supplied electrode plate 22 is used for next process immediately after being manufactured, then the lithium supplied electrode plate reeling device 18 is not required, but directly put the lithium supplied electrode plate 22 into the next process and then put in use.

During the whole lithium supplying process, the lithium strip is protected by substrate, and will never contact with such as the first composite roller set 103, the second composite roller set 103', the electrode plate lithium supply roll-in device 12, thereby preventing the lithium strip from breakage and cut etc.

Figure 3:
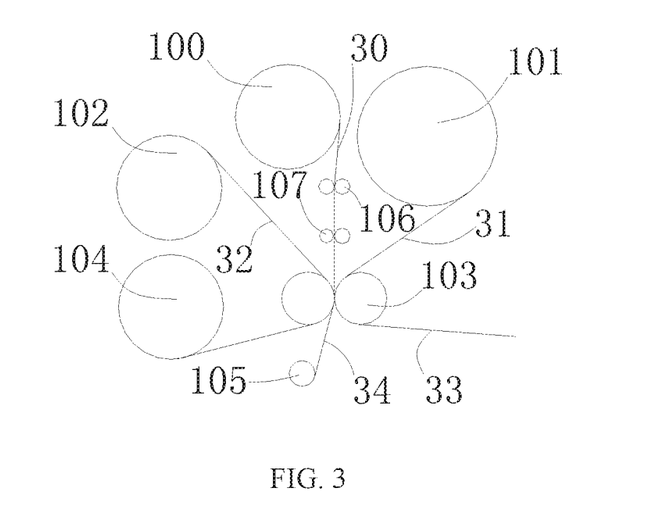
FIG. 3 is a structural schematic view of a first composite lithium strip transportation device provided by an embodiment of the present application.

Due to the limitation of manufacture, transportation and storage etc. of the lithium strip, wavy folds may occur on the lithium strip, such wavy folds will affect the compositing effect of the lithium, thus in the present embodiment, it is preferred to arrange a fixed distance lithium strip smoothing device 106 between the first composite lithium strip transportation device 10 and the second composite lithium strip transportation device 10'. Take the first composite lithium strip transportation device 10 as an example, as shown in FIG. 3, the fixed distance lithium strip smoothing device 106 is arranged between the first lithium strip unreeling device 100 and the first composite roller set 103, the fixed distance lithium strip smoothing device 106 includes two oppositely arranged first smoothing rollers, the distance therebetween can be fixed, the size of the distance may be slightly larger than the thickness of the first lithium strip 30, but smaller than the maximum amplitude of the wavy fold of the first lithium strip 30. Thus, when the wavy fold passes through the gap between the two first smoothing rollers, it will be pressed so that the amplitude of the wavy fold decreases, then the first lithium strip will be more smooth as a whole.

Figure 4:
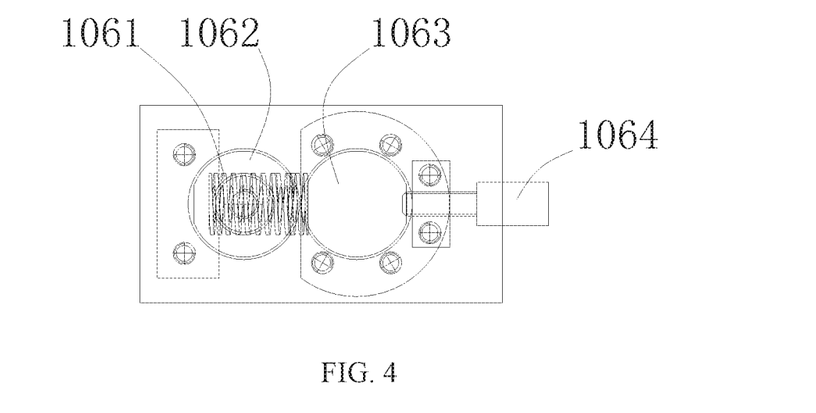
FIG. 4 is a structural schematic view of a fixed distance lithium strip smoothing device provided by an embodiment of the present application.

As shown in FIG. 4, in order to be adapted to lithium strips of different sizes, the fixed distance lithium strip smoothing device 106 further includes a spring 1061 and a gap adjusting mechanism 1064, at this time, the two first smoothing rollers are respectively a first fixed smoothing roller 1062 and a first adjusting smoothing roller 1063, the position of the first fixed smoothing roller 1062 is kept unchanged, and is only enabled to rotate about the circumferential direction, the position of the first adjusting smoothing roller 1063 can also be adjusted in addition to rotating about the circumferential direction, the gap adjusting mechanism 1064 is fixedly arranged on one side of the first adjusting smoothing roller 1063 away from the first fixed smoothing roller 1062, and can push the first adjusting smoothing roller 1063 to move close to the first fixed smoothing roller 1062. The spring 1061 abuts the first fixed smoothing roller 1062 and the first adjusting smoothing roller 1063 at the same time, and is kept being compressed. The gap adjusting mechanism 1064 can adopt a rotating gap adjusting spiral micrometer, when it is needed to adjust the distance between the first fixed smoothing roller 1062 and the first adjusting smoothing roller 1063, the knob of the rotating gap adjusting spiral micrometer can be rotated so that the screw rod head of the rotating gap adjusting spiral micrometer moves, when moving forward and pushing the first adjusting smoothing roller 1063, the first adjusting smoothing roller 1063 can move close to the first fixed smoothing roller 1062, the distance therebetween is reduced. Otherwise, if the screw rod head moves along the direction away from the first adjusting smoothing roller 1063, then the first adjusting smoothing roller 1063 can tightly abut the screw rod head under the action of the spring 1061, and move away from the first fixed smoothing roller 1062, so that the gap therebetween increases. Through rotating the rotating gap adjusting spiral micrometer, the gap can be adjusted accurately, the accuracy can reach 1 μm.

The lithium strip may have the problem of non-uniform thickness in addition to the wavy folds, which may also affect the normal operation of lithium supplying. Therefore, in the present embodiment, an elastic distance lithium strip smoothing device 107 can be arranged in both the first composite lithium strip transportation device 10 and the second composite lithium strip transportation device 10'.

Again, take the first composite lithium strip transportation device 10 as an example, as shown in FIG. 3, the elastic distance lithium strip smoothing device 107 is also arranged between the first lithium strip unreeling device 100 and the first composite roller set 103, when both the fixed distance lithium strip smoothing device 106 and the elastic distance lithium strip smoothing device 107 are provided, it is preferred to arrange the fixed distance lithium strip smoothing device 106 before the elastic distance lithium strip smoothing device 107, so as to first smooth the wavy folds on the first lithium strip, thereby facilitating the thickness smoothing process.

Figure 5:
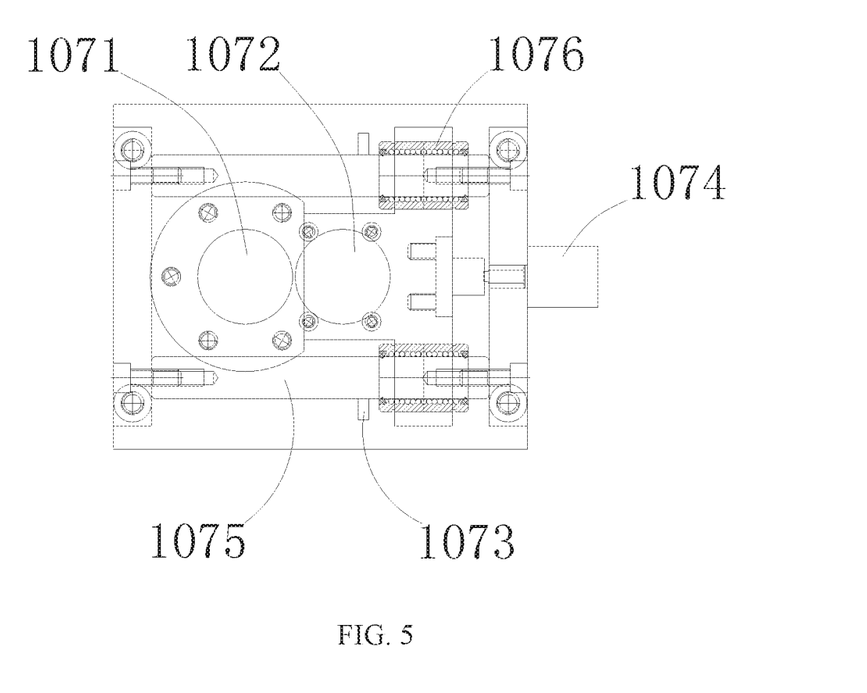
FIG. 5 is a structural schematic view of a flexible distance lithium strip smoothing device provided by an embodiment of the present application.

Specifically, as shown in FIG. 5, the elastic distance lithium strip smoothing device 107 includes a second fixed smoothing roller 1071, a second adjusting smoothing roller 1072, a limiting member 1073 and an elastic pressuring mechanism 1074, the position of the second fixed smoothing roller 1071 remains unchanged, and is only enabled to rotate about the circumferential direction, the position of the second adjusting smoothing roller 1072 can also be adjusted in addition to rotating about the circumferential direction, so as to change the distance between the second fixed smoothing roller 1071 and the second adjusting smoothing roller 1072. The limiting member 1073 is arranged on the moving path of the second adjusting smoothing roller 1072, and can limit the minimum distance between the second fixed smoothing roller 1071 and the second adjusting smoothing roller 1072. The elastic pressuring mechanism 1074 is fixedly arranged at one side of the second adjusting smoothing roller 1073 away from the second fixed smoothing roller 1071, and can apply a constant elastic force to the second adjusting smoothing roller 1072 so that the second adjusting smoothing roller 1072 move close to the second fixed smoothing roller 1071. The elastic pressuring mechanism 1074 can adopt mechanical elastic part such as spring, since a compressed air channel is provided in general manufacturing shop, thus a press-fit cylinder may also be adopted.

In general situation, the second adjusting smoothing roller 1072 will continuously abut the limiting member 1073 under the elastic force of the elastic pressuring mechanism 1074, when the first lithium strip passes through, as long as the thickness of the lithium strip is not so high that the elastic force of the elastic pressuring mechanism 1074 cannot be overcome to push the second adjusting smoothing roller 1072 away, then the portion of the first lithium strip 30 with thickness beyond the gap of the two rollers will be rolled-in by the second fixed smoothing roller 1071 and the second adjusting smoothing roller 1072 to be thinner, so that the thickness of the lithium strip tends to be uniform. When the thickness of the first lithium strip 30 is so big to push the second adjusting smoothing roller 1072 with a high force, or even larger than the elastic force applied by the elastic pressuring mechanism 1074. Under the pushing, the second adjusting smoothing roller 1072 can then move along the direction away from the second fixed smoothing roller 1071, so as to enlarge the gap between the two rollers, so that the portion of the first lithium strip 30 with big thickness can pass through the gap successively without being cut.

In addition, in order to make the movement of the second adjusting smoothing roller 1072 more steady and directional, a guiding pillar 1075 and a sliding block 1076 can be further provided on the elastic distance lithium strip smoothing device 107. The axis of the guiding pillar 1075 is parallel to the central connecting line between the second fixed smoothing roller 1071 and the second adjusting smoothing roller 1072, the sliding block 106 matches and connects with the guiding pillar 1075 and can slide along the axial direction of the guiding pillar 1075, at the same time, the second adjusting smoothing roller 1072 is also fixedly connected with the sliding block 1076. In this way, the second adjusting smoothing roller 1072 can only move along the axial direction of the guiding pillar 1075, forces from other directions will be transferred on the guiding pillar 1075 and then absorbed by the guiding pillar 1075. It is preferred to provide multiple guiding pillars 1075, which are symmetrically distributed with respect to the second adjusting smoothing roller 1072, so as to improve the balance of force stressed. The sliding block 1076 can also adopt a high-accuracy bearing seat, which not only can slide, but also can reduce friction.

The limiting member 1073 can be arranged directly on the moving path of the second adjusting smoothing roller 1072, and can also be arranged on the moving path of the sliding block 1076, as long as the distance between the second fixed smoothing roller 1071 and the second adjusting smoothing roller 1072 can be limited as the minimum. For example, in the present embodiment, the limiting member 1073 is directly fixed on the guiding pillar 1075, the shape can be block shape, ring shape or any other shape. Aiming at lithium strip with common thickness, the minimum distance between the second fixed smoothing roller 1071 and the second adjusting smoothing roller 1072 can be controlled at 300 μm, after being smoothed by the elastic distance lithium strip smoothing device 107, the thickness of the first lithium strip 30 can be adjusted within the range of 300±5 μm.

Since the texture of the lithium strip is soft, when the starting end of each roll of lithium strip passes through the first composite roller set 103 and the second composite roller set 103', the starting end of the lithium strip may be damaged or deformed due to the fact that it has not been strengthened and protected by the substrate. In order to solve this problem, in the present embodiment, the starting end of each roll of lithium strip is provided with a length of traction strip, and a reeling device corresponding to the traction strip is provided at downstream of the composite roller set. Again, take the first composite lithium strip transportation device 10 as an example, as shown in FIG. 1, a first traction strip reeling device 105 is arranged at downstream of the first composite roller set 103, after the traction strip 34 passes through the first composite roller set 103, it will be guided to the first traction strip reeling device 105 to be rolled. Then, the first lithium strip 30 which passes through, together with the traction strip 34, the first composite roller set 103 can be composited with the first substrate 31, to form the first composite lithium strip 33.

During peeling of the first substrate 31 and the third substrate 31', if the peeling angle is not suitable, the phenomenon of partial peeled and electrode plate decarburization may occur, which will damage the electrode plate. Therefore, as shown in FIG. 1, in the present embodiment, the first electrode plate peeling device 13 includes two oppositely arranged first peeling rollers, the distance between the two first peeling rollers can be fixed, what is the most important, the first electrode plate peeling device 13 can rotate about the direction parallel to the axis of the two first peeling rollers. When the first electrode plate peeling device 13 is rotating, the second electrode plate peeling device 13' and the first substrate reeling device 14 are kept static, the peeling angle of the first substrate 31 can be adjusted. Similarly, the second electrode plate peeling device 13' includes two oppositely arranged second peeling rollers, the distance between the two second peeling rollers can be fixed, the second electrode plate peeling device 13' can rotate about the direction parallel to the axis of the two second peeling rollers. When the second electrode plate peeling device 13' is rotating, the first electrode plate peeling device 13 and the third substrate reeling device 14' are kept static, the peeling angle of the third substrate 31' can be adjusted. Therefore, the disadvantage caused by peeling the first substrate 31 and the third substrate 31' can be improved.

In order to guarantee that the first substrate 31 and the third substrate 31' can be reused, the first substrate reeling device 14 and the third substrate reeling device 14' both include a reeling deviation correcting device and a tension device, the reeling deviation correcting device can be configured to be a single edge deviation correcting mode or a central line deviation correcting mode, the deviation correcting sensor can be an ultrasonic wave deviation correcting device, an infrared ray one or a digital one, the executing element can be a motor, a cylinder, a hydraulic cylinder etc.; the tension device can be a cylinder cooperated proportional valve, a position sensor, servo motor cooperated angle sensor, gravity floating roller, cylinder cooperated angle sensor etc. Through actively reeling and the tension deviation correcting device, the peeled substrate can be orderly rolled, which guarantees the flatness of the substrate.

Please refer to FIG. 1, since the lithium supplying process is a continuous manufacturing process, once a defective product is found, it cannot be directly removed during the process. Thus, in the present embodiment, the electrode plate lithium supplying system further includes an appearance detection device 15 and a defective product labeling device 16, the appearance detection device 15 and the defective product labeling device 16 are arranged between the second electrode plate peeling device 13' and the lithium supplied electrode plate reeling device 18 along the process direction in sequence, and are communicatedly connected, so as to achieve automatically control. The appearance detection device 15 can monitor the lithium supplied electrode plate 22 continuously, once a defective product is found, it can transmit a signal to the defective product labeling device 16, so that the defective product labeling device 16 label a defective label on the corresponding position of the lithium supplied electrode plate 22 after receiving the signal. After completing the lithium supply, the processing staff can remove the defective products according to the labels.

Figure 6:
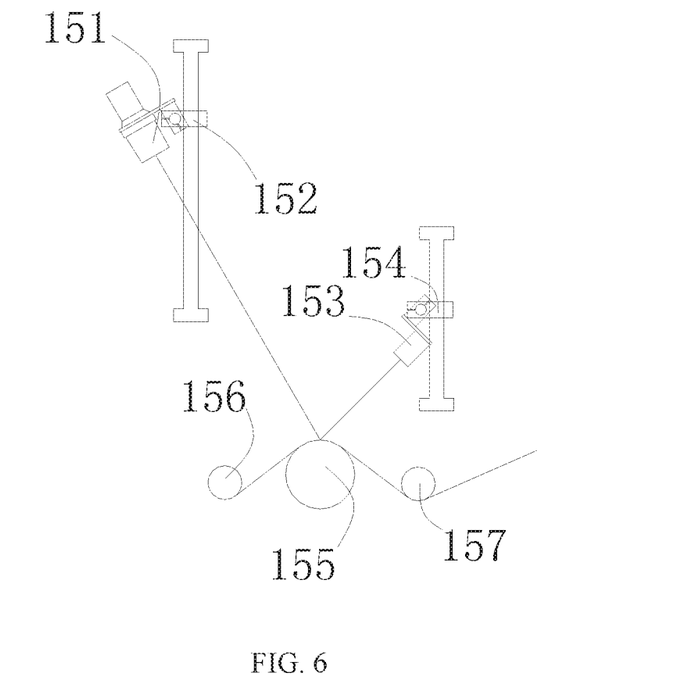
FIG. 6 is a structural schematic view of an appearance detection device provided by an embodiment of the present application.

In order to guarantee double-side detection of the lithium supplied electrode plate 22, in the present embodiment, an appearance detection device 15 is provided at both sides of the lithium supplied electrode plate 22. As shown in FIG. 6, the appearance detection device 15 includes a CCD visual camera 151, a camera height and angle adjusting clamp 152, a light source 153, a light source height and angle adjusting clamp 154, a detecting back roller 155, a steering roller 156/157. When the lithium supplied electrode plate 22 passes through the steering roller 156, and is passing through the detecting back roller 155, the CCD visual camera 151 can detect on the surface of the electrode plate, after detection, the electrode plate passes through the steering roller 157 and exit the detection system. The camera can acquire reasonable detection pictures within reasonable focal length and angle range by the camera height and angle adjusting clamp 152 and the light source height and angle adjusting clamp 154 for defect judgment, the surface of the detecting back roller 155 can be performed with DLC process, hard black oxide coating process, black ceramic coating process etc, so as to facilitate distinguishing between the surface of the electrode plate and the detecting back roll 155, so that the camera acquire explicit detecting area. Through the CCD appearance detection and internal algorithm, large area miss coating, electrode plate cracking, electrode plate copper leaking, electrode plate folding, gummed paper, edge protrusion and so on can be detected explicitly.

Figure 7:
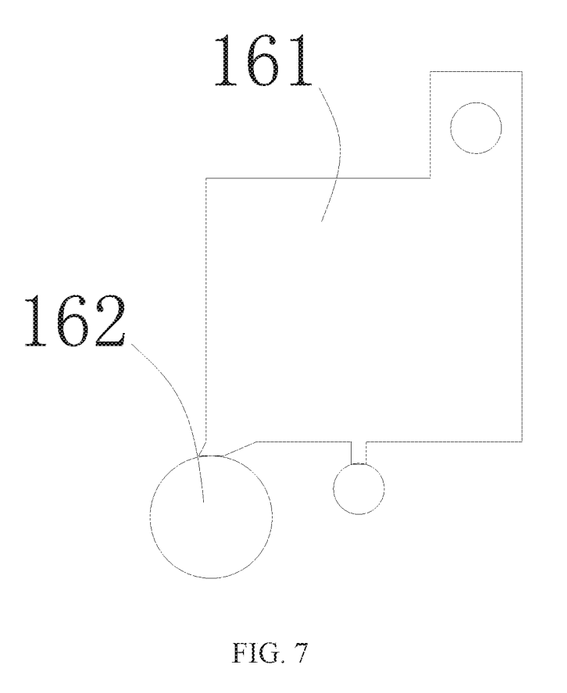
FIG. 7 is a structural schematic view of a defective product labeling device provided by an embodiment of the present application.

As shown in FIG. 7, the defective product labeling device 16 includes a glue adhering machine 161 and a defective product glue adhering roller 162, when the electrode plate passes through the defective product labeling device 16, the glue adhering machine 161 adheres defective product label on the electrode plate on the defective product glue adhering roller 162.

The lithium supplied electrode plate reeling device 18 also includes a reeling deviation correcting device and a tension device, the reeling deviation correcting device can be configured to be a single edge deviation correcting mode or a central line deviation correcting mode, the deviation correcting sensor can be an ultrasonic wave deviation correcting device, an infrared ray one or a digital one, the executing element can be a motor, a cylinder, a hydraulic cylinder etc.; the tension device can be a cylinder cooperated proportional valve, a position sensor, servo motor cooperated angle sensor, gravity floating roller, cylinder cooperated angle sensor etc. Through actively reeling and the tension deviation correcting device, the peeled substrate can be orderly rolled, which guarantees the flatness of the substrate.

In the present embodiment, since temperature reaction will occur between the lithium layer in the lithium supplied electrode plate 22 and the surface material of the electrode plate, thus the lithium supplied electrode plate reeling device 18 is arranged inside the electrode plate reeling cooling device 17. The electrode plate reeling cooling device 17 includes a cooling box 171 and an air curtain sealing device 172, the air curtain sealing device 172 is arranged on the cooling box 171 at the entrance for the lithium supplied electrode plate 20 to enter, so as to prevent the cooling gas from leaking through the entrance. In addition, a reeling temperature monitoring device 19 can real-time detect the surface temperature of the lithium supplied electrode plate 22 after being rolled, and use the detection signal to cooperate with the electrode plate reeling cooling device 17, so as to achieve accurate control of the temperature of the lithium supplied electrode plate 22.

The lithium supplying system provided by embodiments of the present application avoids the lithium strip from breakage and cut during the manufacturing process, meanwhile possesses characteristics such as high accuracy and easy operation etc.

The above are preferred embodiments of the present application, which are not intended to limit the present application, for those skilled in the art, the present application may have multiple modifications and variations. All the modifications, equivalent replacements and improvements made within the spirit and principle of the present application shall fall in the protection scope of the present application.

What is claimed is:

1. A system for supplying lithium to an electrode plate, comprising: an electrode plate unreeling device, a first composite lithium strip transportation device, an electrode plate lithium supply roll-in device, a first electrode plate peeling device a first substrate reeling device, a lithium supplied electrode plate reeling device, an electrode plate reeling cooling device, and a reeling temperature monitoring device, the electrode plate unreeling device and first composite lithium strip transportation device are both arranged at upstream of the electrode plate lithium supply roll-in device, the first electrode plate peeling device is arranged at downstream of the electrode plate lithium supply roll-in device, the first substrate reeling device is arranged at downstream of the first electrode plate peeling device, wherein:

the electrode plate lithium supply roll-in device comprises two oppositely arranged compression rollers, the two compression rollers have a fixed distance with respect to one another, the first composite lithium strip transportation device comprises: a first lithium strip unreeling roller, a first substrate unreeling roller, a second substrate unreeling roller, a second substrate reeling roller and a first composite roller set, the first lithium strip unreeling roller, the first substrate unreeling roller and the second substrate unreeling roller are arranged at upstream of the first composite roller set, the second substrate reeling roller is arranged at downstream of the first composite roller set, wherein the lithium supplied electrode plate reeling device is used for reeling a lithium supplied electrode plate and is arranged inside the electrode plate reeling cooling device, the reeling temperature monitoring device is configured to real-time detect a surface temperature of the lithium supplied electrode plate after being rolled, and use a detection signal to cooperate with the electrode plate reeling cooling device, so as to achieve accurate control of a temperature of the lithium supplied electrode plate.

2. The system for supplying lithium to an electrode plate according to claim 1, further comprising: a second composite lithium strip transportation device, a second electrode plate peeling device and a third substrate reeling device, the second composite lithium strip transportation device is also arranged at upstream of the electrode plate lithium supply roll-in device, the second electrode plate peeling device and the third substrate reeling device are arranged at downstream of the first electrode plate peeling device in sequence, the second composite lithium strip transportation comprises: a second lithium strip unreeling roller, a third substrate unreeling roller, a fourth substrate unreeling roller, a fourth substrate reeling roller and a second composite roller set, the second lithium strip unreeling roller, the third substrate unreeling roller and the fourth substrate unreeling roller are arranged at upstream of the second composite roller set, the fourth substrate reeling roller is arranged at downstream of the second composite roller set.

3. The system for supplying lithium to an electrode plate according to claim 2, characterized in that, the first composite lithium strip transportation device further comprises an elastic distance lithium strip smoothing device, arranged between the first lithium strip unreeling device and the first composite roller set, and/or the second composite lithium strip transportation device further comprises an elastic distance lithium strip smoothing device, arranged between the second lithium strip unreeling device and the second composite roller set, wherein, the elastic distance lithium strip smoothing device comprises a second fixed smoothing roller, a second adjusting smoothing roller, a limiting member and an elastic pressuring mechanism, a location of the second fixed smoothing roller is fixed, a location of the second adjusting smoothing roller is adjustable, the limiting member can limit the minimum distance between the second fixed smoothing roller and the second adjusting smoothing roller, the elastic pressuring mechanism is fixedly arranged at one side of the second adjusting smoothing roller away from the second fixed smoothing roller, and is enabled to apply an elastic force to the second adjusting smoothing roller so that the second adjusting smoothing roller moves close to the second fixed smoothing roller.

4. The system for supplying lithium to an electrode plate according to claim 1, characterized in that, the electrode plate lithium supply roll-in device further comprises a distance adjusting structure, the two compression rollers are a fixed compression roller and an adjustable compression roller respectively, a location of the fixed compression roller is fixed, a location of the adjustable compression roller is adjustable, the distance adjusting structure is arranged at a side of the adjustable compression roller away from the fixed compression roller, and is enabled to drive the adjustable compression roller to move close to or away from the fixed compression roller.

5. The system for supplying lithium to an electrode plate according to claim 4, characterized in that, the distance adjusting structure comprises a rotating motor, a screw rod and a threaded sleeve, the threaded sleeve is fixedly connected with a roller seat of the adjustable compression roller, an axis of the threaded sleeve is parallel to a central connecting line between the fixed compression roller and the adjustable compression roller, the screw rod is threadedly connected with the threaded sleeve, an output end of the rotating motor is co-axially connected with the screw rod, and is enabled to drive the screw rod to rotate.

6. The system for supplying lithium to an electrode plate according to claim 5, characterized in that, the electrode plate lithium supply roll-in device further comprises a compression roller gap limiting mechanism, the compression roller gap limiting mechanism comprises an adjustable screw rod and a limiting inclined block, the limiting inclined block is arranged between roller seats of the fixed compression roller and the adjustable compression roller, and the roller seat of the adjustable compression roller abuts an inclined surface of the limiting inclined block, the adjustable screw rod is threadedly connected with the limiting inclined block, an axis of the adjustable screw rod is perpendicular to a central connecting line between the fixed compression roller and the adjustable compression roller, and forms a sharp angle with the inclined surface of the limiting inclined block.

7. The system for supplying lithium to an electrode plate according to claim 2, characterized in that, the first electrode plate peeling device comprises two oppositely arranged first peeling rollers, the two first peeling rollers have a fixed distance with respect to one another, the first electrode plate peeling device can rotate about a direction parallel to axes of the two first peeling rollers;

and/or the second electrode plate peeling device comprises two oppositely arranged second peeling rollers, the two second peeling rollers have a fixed distance with respect to one another, the second electrode plate can rotate about a direction parallel to axes of the two first peeling rollers.

8. The system for supplying lithium to an electrode plate according to claim 2, wherein the lithium supplied electrode plate reeling device is arranged at downstream of the second electrode plate peeling device.

9. The system for supplying lithium to an electrode plate according to claim 8, wherein the electrode plate reeling cooling device surrounds the lithium supplied electrode plate reeling device.

\* \* \* \* \*